Aug. 24, 1937.  C. GIRL  2,091,068
LOADING AND UNLOADING ATTACHMENT FOR VEHICLES
Filed April 10, 1936  2 Sheets-Sheet 1
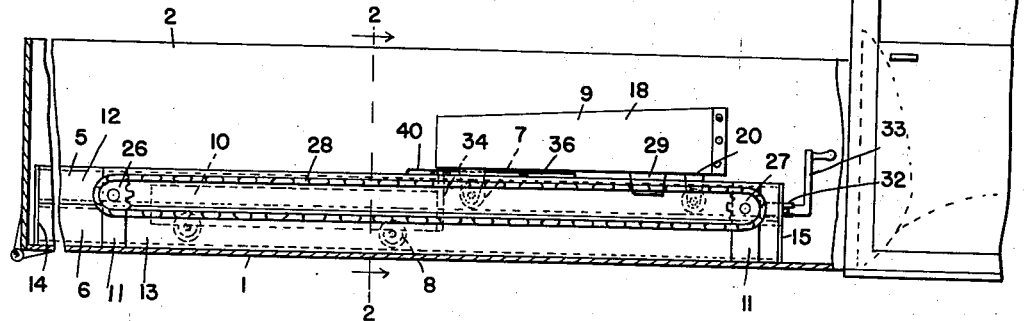
FIG.1.
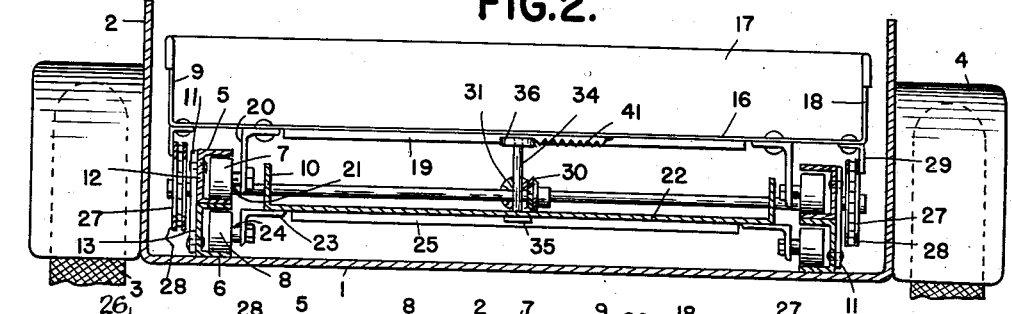
FIG.2.
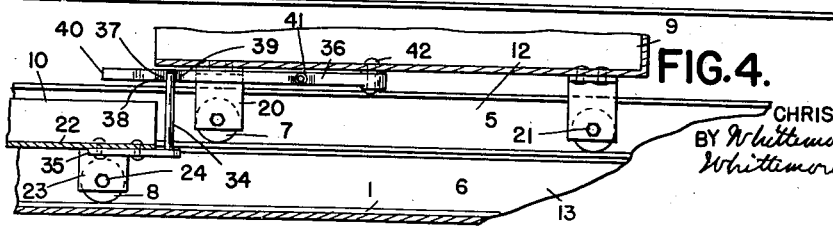
FIG.3.
FIG.4.
INVENTOR
CHRISTIAN GIRL
BY Whittemore Hulbert
Whittemore & Belknap
ATTORNEYS Aug. 24, 1937.  C. GIRL  2,091,068
LOADING AND UNLOADING ATTACHMENT FOR VEHICLES
Filed April 10, 1936   2 Sheets-Sheet 2

INVENTOR
CHRISTIAN GIRL
BY *Whittemore Hulbert*
*Whittemore & Belknap*
ATTORNEYS Patented Aug. 24, 1937

2,091,068

UNITED STATES PATENT OFFICE 2,091,068

LOADING AND UNLOADING ATTACHMENT FOR VEHICLES

Christian Girl, Detroit, Mich., assignor to Kelch Heater Company, Detroit, Mich., a corporation of Michigan Application April 10, 1936, Serial No. 73,738

12 Claims. (Cl. 214—65)

This invention relates generally to loading and unloading devices for vehicles and refers more particularly to a device for loading and unloading from an accessible point of a vehicle the relatively inaccessible portions thereof.

One of the essential objects of the invention is to provide a device of this character that may be readily applied as an attachment to a truck or to the rear deck or storage compartment of a coupe.

Another object is to provide a device that includes two trays at different levels that may be moved together or separately according to load requirements.

Another object is to provide one of said trays with a positive drive or actuating mechanism which may be easily and conveniently operated from a suitable point of the vehicle, and to provide the other of said trays with a coupling whereby it may be connected to and disconnected from the first mentioned tray as desired.

Another object is to provide a loading and unloading device which is so constructed and arranged that both trays may be moved forwardly a sufficient distance to permit additional articles to be loaded in rear thereof on the truck or in the storage compartment of the coupe as the case may be.

Other objects, advantages and novel details of construction of this invention will be made more apparent as this description proceeds, especially when considered in connection with the accompanying drawings, wherein:

Figure 1 is a fragmentary side elevation of a truck with a loading and unloading device embodying my invention applied thereto;

Figure 2 is a cross sectional view taken substantially on the line 2—2 of Figure 1;

Figure 3 is a top plan view of the structure shown in Figure 1;

Figure 4 is a sectional view taken substantially on the line 4—4 of Figure 3;

Figure 5:
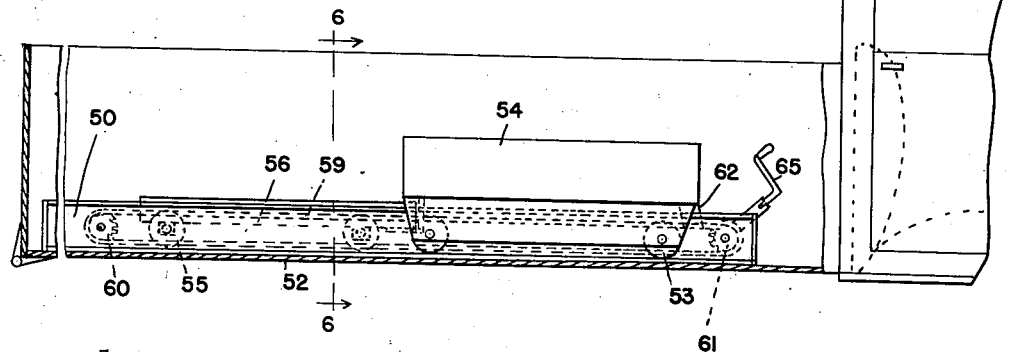
Figure 5 is a view similar to Figure 1, but showing a slight modification.

Referring now to the drawings, 1 is the floor, 2 are the upright sides, 3 are the ground-engaging wheels, and 4 are the fenders of a truck of conventional design.

5 and 6, respectively, are inwardly opening channels arranged in superposed relation on the floor 1 adjacent the upright sides 2 of the truck and forming runways for the supporting casters or rollers 7 and 8, respectively, of upper and lower article carrying trays 9 and 10. 11 are upright plates rigidly connected to the vertical webs 12 and 13, respectively, of the channels and forming braces therefor, and 14 and 15, respectively, are cross bars rigidly connected to said channels and plates at opposite ends thereof and cooperating therewith to provide a substantially rectangular frame.

Preferably the upper tray 9 has a substantially flat bottom 16 and upright front and side walls 17 and 18. Channel-shaped cross bars 19 are secured to the bottom 16 of the tray for reinforcing purposes, while longitudinally extending angles 20 are provided at opposite ends of said cross bars for carrying the stub shafts 21 for the rollers 7.

The lower tray 10 has a flat bottom 22 secured to angles 23 carrying the stub shafts 24 for the rollers 8 and is also provided with reinforcing cross bars 25.

With the construction thus far described, it is apparent that the upper tray 16 may travel from substantially one end to the other of the upper runways 5 over and independently of the lower tray 10, while the latter may travel from substantially one end to the other of the lower runways 6 under and independently of the upper tray 9.

Preferably a positive drive is provided for the upper tray 9, and for this purpose I provide suitable sprocket wheels 26 and 27 upon the outer sides of the plates 11 at spaced points longitudinally thereof, endless chains 28 trained around said sprocket wheels and connected by clips 29 to the upper tray 9, a beveled gear 30 rigid with a shaft 30' for the rear sprocket wheels 27, a bevel gear 31 meshing with the bevel gear 30 and having a stub shaft 32 journaled in the rear cross bar 15, and a removable crank 33 for said stub shaft. Thus, by turning the crank 33, the gearing 31, 30 will cause the chain 28 to move the upper tray 9 along the upper runways 5.

In order that the lower tray 10 may move in unison with the upper tray 9, I provide a suitable coupling which preferably consists of a pin 34 carried by a bracket 35 fastened to the lower tray 10, and a lever 36 pivoted at one end upon the upper tray and having an open notch 37 adjacent its other end for receiving the pin 34. Preferably portions 38 and 39, respectively, fore and aft of the notch 37 are inclined as shown to facilitate entry of the pin into the notch. The free end of the lever is provided with a handle portion 40, and a spring 41 is provided intermediate said notch 37 and pivot 42 for holding the notched portion of the lever in engagement with the pin 34. Thus, with this construction the upper and lower trays 9 and 10 may be coupled together so that they will move in unison when the crank 33 is turned as aforesaid and may be easily uncoupled by manipulation of the handle 40.

In use, either the upper tray 9 alone or the upper and lower trays 9 and 10 in unison may be loaded from the rear of the truck and then moved forwardly by the crank 33 toward the relatively inaccessible forward end of the truck. In either instance, after the trays have been moved forwardly, the space on the truck in rear of such trays may be loaded with articles. When uncoupled, the upper tray 9 may be moved by the crank over and beyond the lower tray 10 or the latter may be moved by hand under and beyond the upper tray as desired.

Figure 6:
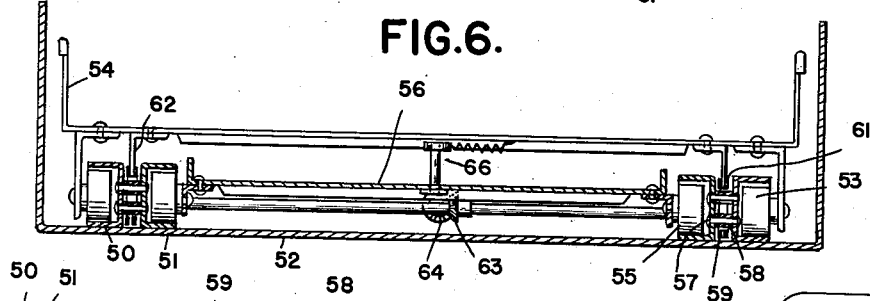
Figure 6 is a cross sectional view taken substantially on the line 6—6 of Figure 5.
Figure 7:
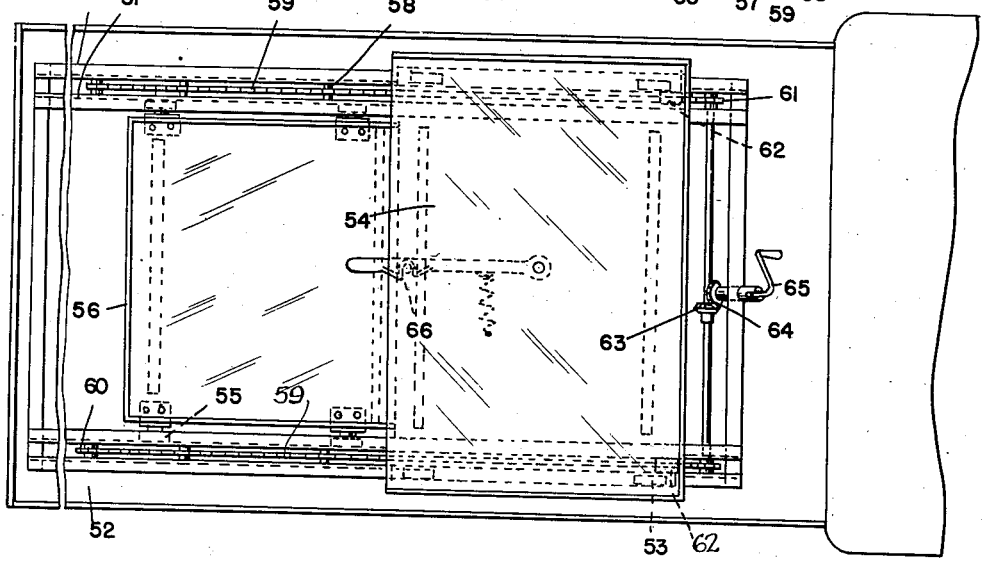
Figure 7 is a top plan view of the structure shown in Figure 5.

In Figures 5 to 7, I have illustrated a slight modification in which the channel runways 50 and 51, respectively, are arranged side by side in the same horizontal plane on the floor 52 of the truck. The supporting rollers 53 for the upper tray 54 travel in the outer channels 50, while the supporting rollers 55 for the lower tray 56 travel in the inner channels 51. Suitable headed elements 57 connect the inner and outer channels 50 and 51 together while tubular spacers 58 are provided on said headed elements between said channels. In this construction an endless chain 59 is received in the space between the channels 50 and 51 and is trained around sprocket wheels 60 and 61 also between said channels. Brackets 62 connected to the chains 59 and upper tray 54 constitute the driving connection between said parts, while suitable beveled gearing 63 and 64 and a removable crank 65 constitute the driving means for said sprocket wheel 61 and chain 59. A coupling 66 similar to the coupling illustrated in Figure 3 is also provided between the upper and lower trays 54 and 56. In use, the operation of this form of the invention is similar to the operation of the form illustrated in Figures 1 to 3.

If desired, either the form shown in Figures 1 to 3 or the form shown in Figures 5 to 7 may be mounted within the rear deck or storage compartment (not shown) of a coupe for loading the relatively inaccessible forward end of said compartment.

It is also to be understood that the runway structure shown in Figures 1 to 4 or the runway structure shown in Figures 5 to 7 may be mounted crosswise instead of lengthwise of a vehicle so that articles may be loaded or unloaded from one side or the other of such vehicle.

What I claim as my invention is:

1. In a loading and unloading device of the class described, an upper tray and a lower tray movable in unison and relative to each other, two contiguous sets of runways for said trays, one set for each tray, actuating means for one of said trays including rotatable elements at spaced points longitudinally of said runways, an endless flexible member trained around said rotatable elements, a driving connection between said flexible member and one of said trays, gearing connected to one of said rotatable elements, an operating member for said gearing, and means for detachably coupling the other of said trays to the driven tray.

2. In a loading and unloading device of the class described, an upper tray and a lower tray movable in unison and relative to each other, runways for said trays, and actuating means for said trays including rotatable elements at spaced points longitudinally of said runways, an endless flexible member trained around said rotatable elements, a driving connection between said flexible member and one of said trays, means for driving one of said rotatable elements, and means for detachably coupling the other of said trays to the driven tray.

3. In a loading and unloading device of the class described, an upper tray and a lower tray movable in unison and relative to each other, two contiguous sets of runways for said trays, one set for each tray, actuating means for one of said trays including rotatable elements at spaced points longitudinally of said runways, an endless flexible member trained around said rotatable elements, a driving connection between said flexible member and one of said trays, driving mechanism for one of said rotatable elements, an operating member for said driving mechanism, and means for detachably coupling the other of said trays to the driven tray.

4. A vehicle loading and unloading device comprising upper and lower article carrying trays, two contiguous sets of runways for said trays constructed and arranged so that the upper tray may move over one set beyond the lower tray and the lower tray may move over the other set under and beyond the upper tray, actuating means for one of said trays including means movable between the two contiguous sets of runways, and means for detachably coupling the second tray to the driven tray.

5. A vehicle loading and unloading device comprising two contiguous sets of runways, article carrying trays movable lengthwise of said runways, one for each runway, the construction of said trays and runways being such that one tray may move over one set over and beyond the second tray, and the second tray may move over the other set under and beyond the first tray, actuating means for one of said trays including means movable beside the two contiguous sets of runways, and means for detachably coupling the second tray to the driven tray.

6. A vehicle loading and unloading device comprising upper and lower article carrying trays, and two contiguous sets of runways for said trays, one set comprising inwardly opening channels, the other set comprising outwardly opening channels, said inwardly and outwardly opening channels being back to back in a common horizontal plane, rollers connected to one of said trays and engaging the inwardly opening channels, and rollers connected to the other of said trays and engaging the outwardly opening channels.

7. A vehicle loading and unloading device comprising upper and lower article carrying trays, and two contiguous sets of runways for said trays, both sets of runways comprising inwardly opening channels, said sets of channel-shaped runways being arranged one upon the other, rollers connected to one of said trays and engaging the runways of one set, and rollers connected to the other of said trays and engaging the runways of the other set.

8. In a loading and unloading device of the class described, an upper tray and a lower tray movable in unison and relative to each other, two contiguous sets of runways for said trays, one set for each tray, actuating means for one of said trays, and means for detachably coupling the other of said trays to the driven tray, the arrangement being such that when said trays are uncoupled the upper tray may move over and beyond the lower tray, and the lower tray may move under and beyond the upper tray.

9. In a device of the class described, upper and lower article carrying trays, two substantially contacting sets of runways for said trays, rollers connected to one of said trays and engaging the runways of one set, and rollers connected to the other of said trays and engaging the runways of the other set, the arrangement being such that the upper tray may move over and beyond the lower tray, and the lower tray may move under and beyond the upper tray.

10. A vehicle loading and unloading device comprising upper and lower article carrying trays, and two contiguous sets of runways for said trays, said runways being back-to-back in a common horizontal plane, rollers connected to one of said trays and engaging one set of runways, and rollers connected to the other of said trays and engaging the other set of runways, the arrangement being such that when said trays are uncoupled the upper tray may move over and beyond the lower tray, and the lower tray may move under and beyond the upper tray.

11. A vehicle loading and unloading device comprising upper and lower article carrying trays, and two contiguous sets of runways for said trays, said sets of runways being arranged one upon the other, rollers connected to one of said trays and engaging the runways of one set, and rollers connected to the other of said trays and engaging the runways of the other set, the arrangement being such that when said trays are uncoupled the upper tray may move over and beyond the lower tray, and the lower tray may move under and beyond the upper tray.

12. In a device of the class described, upper and lower article carrying trays movable in unison and relative to each other, two substantially contacting sets of runways for said trays, rollers connected to one of said trays and engaging the runways of one set, rollers connected to the other of said trays and engaging the runways of the other set, a drive means connected to one of said trays to actuate the same, and means for coupling the second tray to the driven tray so that both trays will move in unison and for uncoupling the second tray from the driven tray so that either tray may move relative to the other.

CHRISTIAN GIRL.